(12) United States Patent
Hawman

(10) Patent No.: US 7,397,893 B2
(45) Date of Patent: Jul. 8, 2008

(54) METHOD AND APPARATUS FOR SIMULTANEOUS EMISSION AND TRANSMISSION SPECT USING OBLIQUE LINE SOURCES

(75) Inventor: Eric G. Hawman, Schaumburg, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 90 days.

(21) Appl. No.: 11/236,036

(22) Filed: Sep. 27, 2005

(65) Prior Publication Data
US 2006/0067466 A1 Mar. 30, 2006

(51) Int. Cl.
G01N 23/04 (2006.01)
G01T 1/161 (2006.01)

(52) U.S. Cl. ............... 378/62; 250/363.04; 250/363.09
(58) Field of Classification Search .............. 378/9, 378/62; 250/363.02, 363.04, 363.09
See application file for complete search history.

(56) References Cited

U.S. PATENT DOCUMENTS

| | | | | | |
|---|---|---|---|---|---|
| 5,055,687 | A | * | 10/1991 | Ichihara | 250/363.09 |
| 5,210,421 | A | * | 5/1993 | Gullberg et al. | 250/363.04 |
| 5,596,197 | A | * | 1/1997 | Jones et al. | 250/363.04 |
| 5,608,221 | A | * | 3/1997 | Bertelsen et al. | 250/363.03 |
| 5,629,971 | A | * | 5/1997 | Jones et al. | 378/145 |
| 5,672,877 | A | * | 9/1997 | Liebig et al. | 250/363.04 |
| 5,739,540 | A | * | 4/1998 | Motomura et al. | 250/363.04 |
| 5,834,780 | A | * | 11/1998 | Morgan et al. | 250/363.04 |
| 6,060,712 | A | * | 5/2000 | Morgan et al. | 250/363.04 |
| 6,201,247 | B1 | * | 3/2001 | Lutheran et al. | 250/363.04 |
| 6,259,097 | B1 | * | 7/2001 | Shao et al. | 250/363.04 |
| 6,271,524 | B1 | * | 8/2001 | Wainer et al. | 250/363.03 |
| 6,429,433 | B1 | * | 8/2002 | Gagnon et al. | 250/363.02 |
| 6,963,065 | B2 | * | 11/2005 | Conti et al. | 250/252.1 |

FOREIGN PATENT DOCUMENTS

WO WO 9100048 A2 * 1/1991

* cited by examiner

Primary Examiner—Edward J. Glick
Assistant Examiner—Anastasia Midkiff

(57) ABSTRACT

A nuclear medicine imaging system includes a bed having a direction of translation, a detector disposed rotationally about an axis of rotation substantially parallel to the direction of translation, and a radioactive line source disposed rotationally about the bed substantially opposite the detector at a first predetermined non-zero angle to the axis of rotation and a second predetermined non-zero angle to a plane of rotation of the detector. The bed may be translated along the along the direction of translation while the detector is rotated about the axis of rotation.

18 Claims, 6 Drawing Sheets

METHOD AND APPARATUS FOR SIMULTANEOUS EMISSION AND TRANSMISSION SPECT USING OBLIQUE LINE SOURCES

BACKGROUND OF THE INVENTION

1. Field of Invention

This invention relates to the field of nuclear medicine, and in particular to nuclear medicine imaging systems.

2. Description of the Related Art

Nuclear medicine is a unique medical specialty wherein radiation is used to acquire images that show the function and anatomy of organs, bones or tissues of the body. During one form of imaging, so-called Single Photon Emission Computerized Tomography (SPECT) imaging, radio-pharmaceuticals may be introduced into the body, either by injection or ingestion, and are attracted to specific organs, bones or tissues of interest. Such radio-pharmaceuticals produce gamma photon emissions that emanate from the body.

One or more detectors are used to detect the emitted gamma photons, and the information collected from the detector(s) is processed to calculate the position of origin of the emitted photon from the source (i.e., the body organ or tissue under study). The accumulation of a large number of emitted gamma positions allows an image of the organ or tissue under study to be displayed.

In another form of imaging, called transmission imaging, radiation from a radioactive source passes through an object and is collected by a detector. Different structures within the object collect or retard the progress of radiation differently, producing images representative of those structures at the detector.

If a radioactive line source is used, it may be swept across the detector's field of view, behind the object to be viewed. The detector then receives the transmitted radiation from the line source as it passes successive locations of the object. If the detector is rotated around the object to get a 360° image, the line source may be placed parallel to the axis of rotation of the detector, and offset somewhat. As the detector moves around the object, the relative motion between it and the line source will sweep the line source across the detector's field of view, behind the object.

If, on the other hand, the detector translates along the length of the object, the line source may be placed normal to the direction of translation. As the detector moves down the object, the relative motion between it and the line source will sweep the line source across the detector's field of view.

If both rotation and translation are desired, however, these two line source orientations are mutually incompatible. Neither orientation will suit both detector rotation about the direction of translation, and translation of the bed itself.

If, e.g. the line source is normal to the direction of translation, its length won't sweep across the field of view of a rotating detector. Conversely, if the line source is parallel to the direction of translation, its length won't sweep across the field of view of a translating detector.

In this case, either two line sources are used, one parallel to and the other normal to the direction of translation, or else rotation and translation are performed in separate passes. The line source is placed parallel to the axis of rotation and a rotation pass is made, and then the line source is rotated 90° to the axis of rotation, or normal to the direction of translation, and a second, translation pass is made. If the axis of rotation of the detector is parallel to the direction of translation.

Proper imaging requires that the detector be relatively stationary with respect to the line source to eliminate or minimize distortions. Such distortions can be caused, for example, by lack of a uniform response to incident radiation over the entire area of the scintillation detector surface, by non-linear responses to incident radiation by different photo-multiplier tubes arrayed over the scintillation crystal, and by variations in the energy window defining the range of photon energy levels of a scintillation interaction or "event" that will be accepted as contributing to the image.

SUMMARY OF THE INVENTION

A primary object of the invention is to overcome the deficiencies of the related art described above by providing a nuclear medicine imaging system. The present invention achieves these objects and others by providing a nuclear medicine imaging system using oblique line sources.

In several aspects, the invention may provide a nuclear medicine imaging system. In particular, in a first aspect of the invention, a nuclear medicine imaging system includes a bed having an direction of translation, a detector disposed rotationally about an axis of rotation substantially parallel to the direction of translation, and a radioactive line source disposed rotationally about the bed substantially opposite the detector at a first predetermined non-zero angle to the axis of rotation and a second predetermined non-zero angle to a plane of rotation of the detector.

In a second aspect of the invention, a method of nuclear medicine imaging includes the steps of translating a bed along an direction of translation, rotating a detector about an axis of rotation substantially parallel to the direction of translation, disposing a radioactive line source substantially opposite the detector at a first predetermined non-zero angle to the axis of rotation and a second predetermined non-zero angle to a plane of rotation of the detector, and rotating the radioactive line source about the axis of rotation.

In a third aspect of the invention, a system for nuclear medicine imaging includes means for translating a bed along an direction of translation, means for rotating a detector about an axis of rotation substantially parallel to the direction of translation, means for disposing a radioactive line source substantially opposite the detector at a first predetermined non-zero angle to the axis of rotation and a second predetermined non-zero angle to a plane of rotation of the detector, and means for rotating the radioactive line source about the axis of rotation.

The above and other features and advantages of the present invention, as well as the structure and operation of various embodiments of the present invention, are described in detail below with reference to the accompanying drawings.

BRIEF DESCRIPTION OF THE SEVERAL VIEWS OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements. A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Since mounting a transmission line source obliquely with respect to a tomographic axis of rotation would allow emission and transmission data to be measured substantially simultaneously, it may be desirable to mount the transmission line source obliquely with respect to the tomographic axis of rotation. Furthermore, since relative motion between the line source and the detector contributes to variations in the images, it may be desirable to mount the transmission line source statically with respect to the detector. Furthermore, since mounting the transmission line source obliquely with respect to the tomographic axis of rotation would enable the transmission line source to be mounted statically with respect to a camera head, it may be desirable to mount the transmission line source obliquely with respect to the tomographic axis of rotation. Finally, since mounting the transmission line source obliquely with respect to the tomographic axis of rotation would enable the detector to view the line source while undergoing rotation as well as translation, it may be desirable to mount the transmission line source obliquely with respect to the tomographic axis of rotation.

In particular, since mounting the transmission line source statically with respect to a camera head may lower costs and improve reliability relative to a "moving line" source transmission system, it may be desirable to mount the transmission line source statically with respect to the camera head. Furthermore, since mounting the transmission line source statically with respect to the camera head may reduce sampling ambiguity, it may be desirable to mount the transmission line source statically with respect to the camera head. Finally, since mounting the transmission line source statically with respect to the camera head may improve emission-transmission down-scatter estimation and obviate the need for pre-scan measurements, it may be desirable to mount the transmission line source statically with respect to the camera head.

Figure 1:
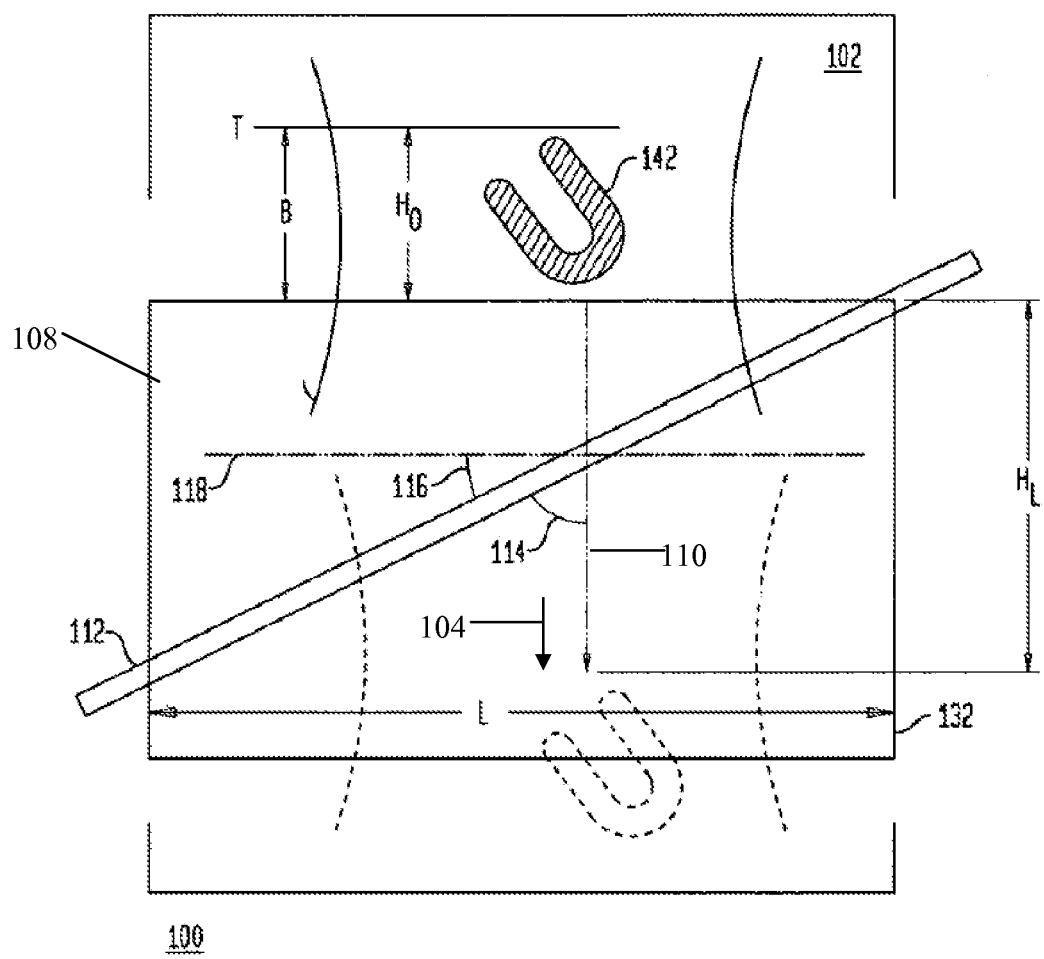
FIG. 1 shows a side view of a detector and a line source for use with a nuclear imaging system according to a first embodiment of the invention.
Figure 2:
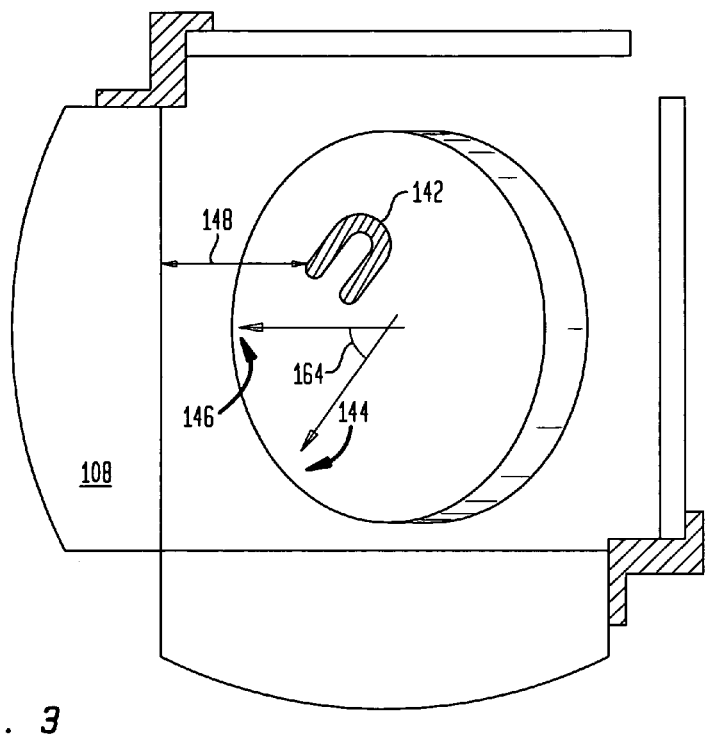
FIG. 2 shows a rear view of the detector and line source shown in FIG. 1.

A nuclear medicine imaging system 100 according to a first embodiment of the invention is shown in FIGS. 1 and 2. Nuclear imaging system 100 may include a bed 102 having a direction of translation 104.

A detector 108 having a field of view generally coincident with the boundaries of the detector 108, may be disposed rotationally about an axis of rotation 110 which is substantially parallel to direction of translation 104. In one embodiment, detector 108 is selected from the group consisting of: a radiation detector, a camera, and a gamma camera. A radioactive line source 112 may be disposed rotationally about bed 102 substantially opposite detector 108 at a first predetermined non-zero angle 114 to axis of rotation 110 and a second predetermined non-zero angle 116 to a plane of rotation 118 of detector 108.

In one embodiment, first predetermined non-zero angle 114 is between about 1° and 89°. In another embodiment, second predetermined non-zero angle 116 is between about 89° and 1°. In several embodiments, first predetermined non-zero angle 114 is selected from the group consisting of: 30°, 45°, and 60°. In several other embodiments, second predetermined non-zero angle 116 is selected from the group consisting of: 30°, 45°, and 60°.

In one embodiment, radioactive line source 112 is substantially fixed relative to detector 108. In another embodiment, radioactive line source 112 is hinged relative to detector 108, and can be swung out from detector 108 for replacement or maintenance, or to use detector 108 to detect radiation from alternate sources without interference from line source 112. In various embodiments, source 112 may be a Cobalt-57 (57Co) line source, a Technetium-99m (Tc-99m) line source, or a Gadolinium-153 (Gd-153) line source, with a projected length 132 exceeding a lateral dimension of field of view 140.

As shown in FIG. 2, detector 108 may be rotated incrementally from a first position 144 to a second position 146. In one embodiment, bed 102 may be translated incrementally from a first position to a second position as well. In this embodiment, detector 108 may be rotated about axis of rotation 110 while bed 102 is translating. In one embodiment, a substantially predetermined distance 148 may be maintained from detector 108 to object 142 during rotation.

In one embodiment, a linear translation of bed 102 may be synchronized with a rotation of a gantry of detector 108. In this embodiment, a standard parallel beam configuration may be used. In this embodiment, a patient lying on bed 102 may be moved axially through a range $H_L$, shown in FIG. 1, covered by line source 112 in substantially the same time it takes detector 108 to rotate 360°, or the angular rotation range of detector 108.

In this embodiment, the angular step size is:

$$\Delta \Theta = \frac{2\Pi}{N}$$

where N is the number of steps. The axial step size is:

$$\Delta y = \frac{H_L}{N}$$

A complete set of sinogram data for an object can be obtained in one rotation of detector 108.

For a single line source, the axial length should be at least:

$H_O + H_L$

The corresponding rotation of detector 108 will then be:

$$2\Pi + \left(\frac{H_O}{\Delta y}\right)\left(\frac{2\Pi}{N}\right) = 2\Pi\left(1 + \frac{H_O}{N\Delta y}\right) = 2\Pi\left(1 + \frac{H_O}{H_L}\right)$$

Figure 3:
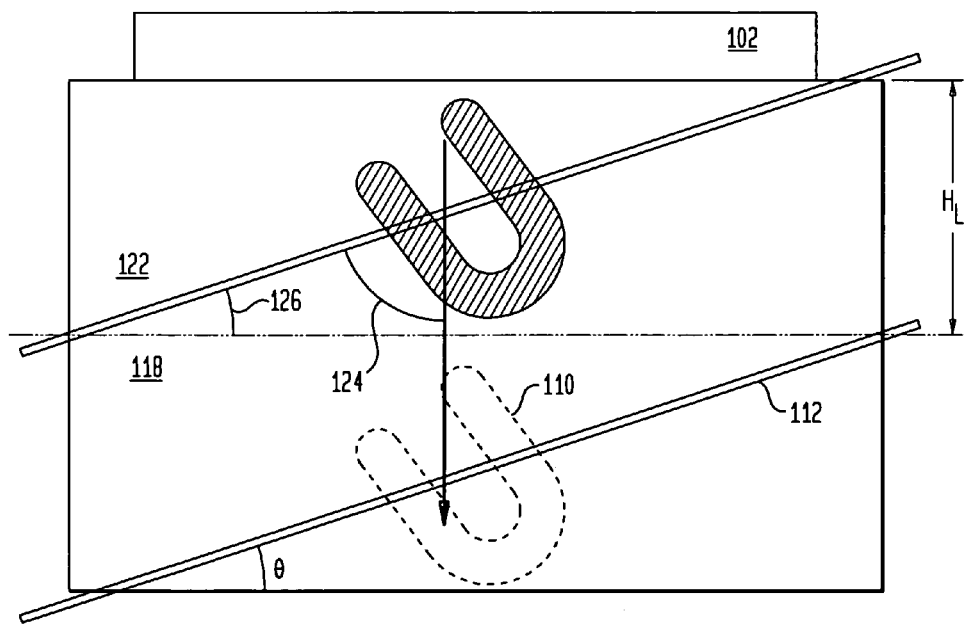
FIG. 3 shows a side view of a detector and a line source for use with a nuclear imaging system according to a second embodiment of the invention.

For an object whose axial extent $H_O$ covers less than one-half of detector 108 field of view, it may be advantageous to use more than one line source 112, 122, as shown in FIG. 3. In this embodiment object 142 of interest may be within the field of view of detector 108 at all times. In this embodiment axial over-scanning may not be required, and a rotation of detector is just 2π. The axial step size is:

$$\frac{H_L}{N}$$

Figure 4:
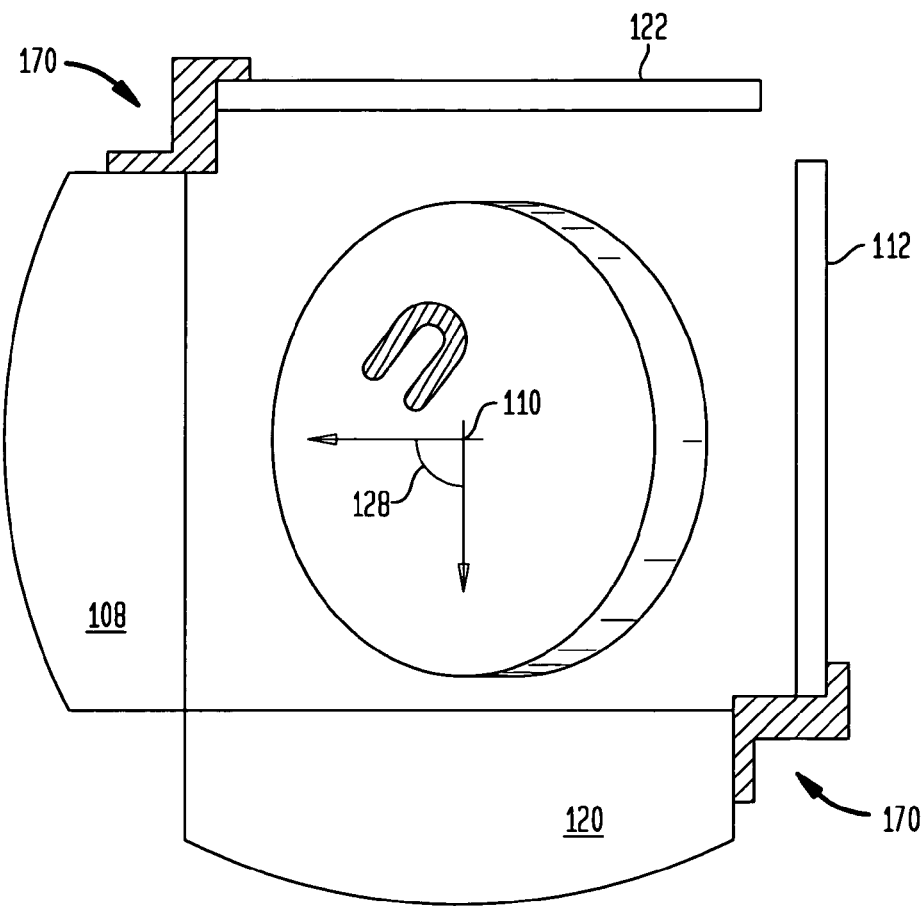
FIG. 4 shows a rear view of the detector and line source shown in FIG. 3.
Figure 5:
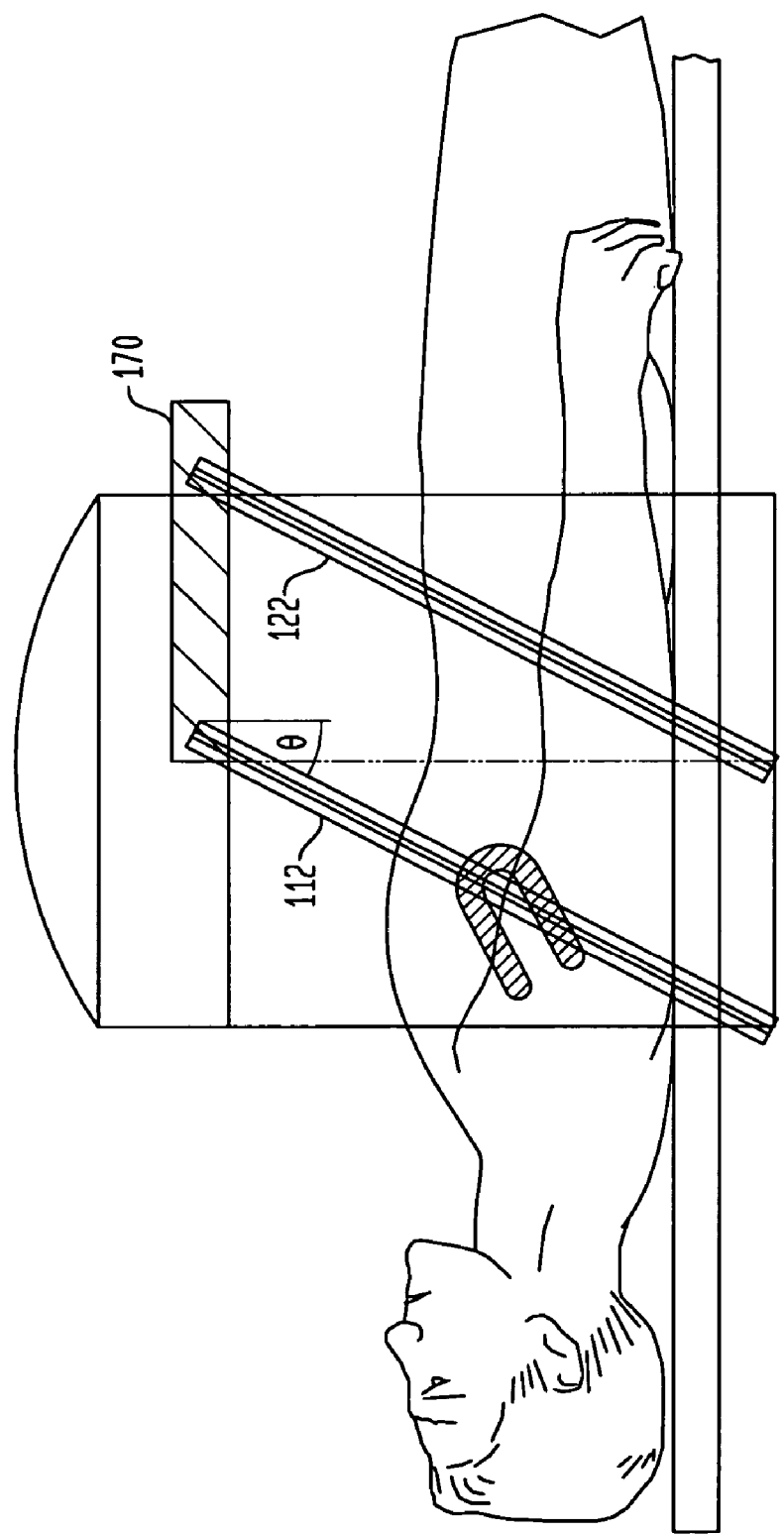
FIG. 5 shows an alternate side view of the detector and line source shown in FIG. 3.

In a second embodiment, shown in FIGS. 3, 4 and 5, a secondary detector 120 may be disposed rotationally about bed 102, and a secondary radioactive line source 122 may be disposed rotationally about bed 102 opposite secondary detector 120 at a first secondary predetermined non-zero angle 124 to axis of rotation 110 and a second secondary predetermined non-zero angle 126 to plane of rotation 118.

In several embodiments, secondary detector 120 is indexed about axis of rotation 110 relative to detector 108 by a secondary angle 128 of about 90° or about 180°. If secondary detector 120 is indexed about axis of rotation 110 relative to detector 108 by a secondary angle 128 of about 90°, it will be at right angles to detector 108. In this embodiment, line sources 112, 122 could be mounted in a holder and attached opposite each of detectors 108, 120, while in another embodiment, line sources 112, 122 are attached to a side of detectors 108, 120 at oblique angles to faces of detectors 108, 120, as shown in FIG. 5. In this embodiment, holder 170 may be a boom arm.

Figure 6:
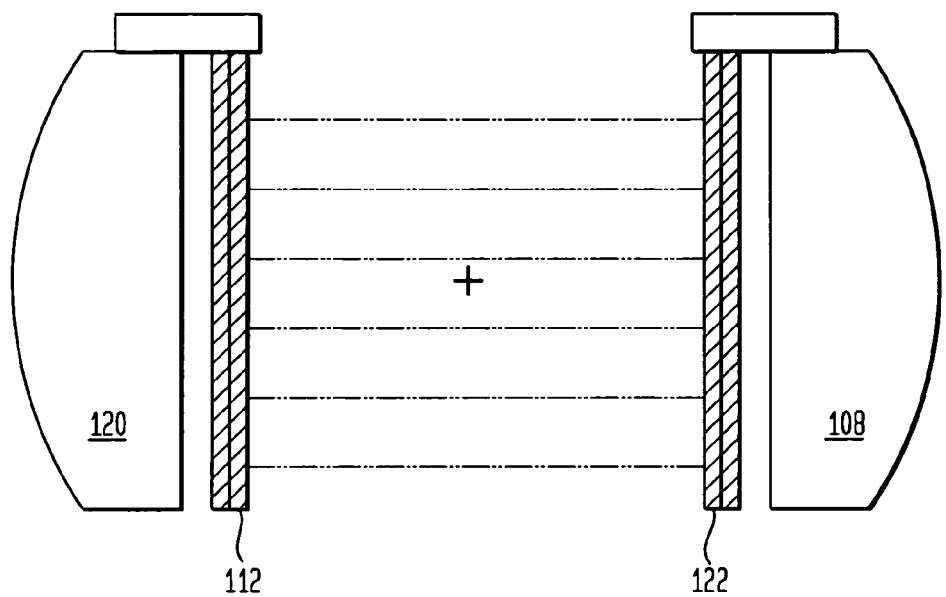
FIG. 6 shows a top view of a detector and a line source for use with a nuclear imaging system according to a third embodiment of the invention.
Figure 7:
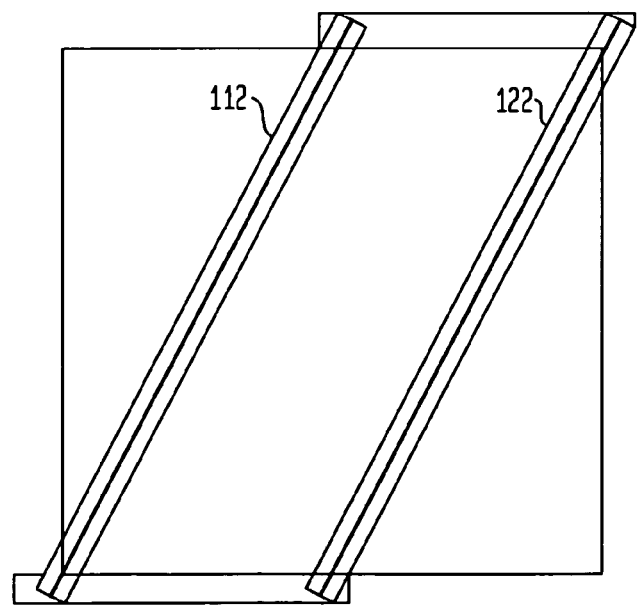
FIG. 7 shows a side view of the detector and line source shown in FIG. 5.

If, on the other hand, secondary detector 120 is indexed about axis of rotation 110 relative to detector 108 by a secondary angle 128 of about 180.degree., it will be across from detector 108, as shown in FIG. 6. When mounted over detectors 108, 120 in the 180° configuration the line source holder 170 may obstruct a small portion of detectors 108, 120, as shown in FIG. 7. Since object 142 moves axially during acquisition of the scan and the configuration variation permits the emission rays that are obstructed by line source holder 170 for a given object position and view angle, to be measured in another view. In one embodiment, a line source holder 170 was attached over the face of one detector and the emission data from the head may be used together with the emission data of the other detector with appropriate response compensation for the projection set.

In a fourth embodiment, a method of nuclear medicine imaging may include the steps of disposing a bed 102, translating bed 102 along a direction of translation 104, rotating a detector 108 about an axis of rotation 110 substantially parallel to direction of translation 104, disposing a radioactive line source 112 substantially opposite detector 108 at a first predetermined non-zero angle 114 to axis of rotation 110 and a second predetermined non-zero angle 116 to a plane of rotation 118 of detector 108, and radioactive line source 112 may be rotated about axis of rotation 110.

In one embodiment, a secondary detector 120 may be rotated about bed 102, and a secondary radioactive line source 122 may be disposed substantially opposite detector 108 at a first secondary predetermined non-zero angle 124 to axis of rotation 110 and a second secondary predetermined non-zero angle 126 to a plane of rotation 118 of secondary detector 120, and secondary radioactive line source 122 may be rotated about axis of rotation 110.

In one embodiment, bed 102 may be translated in a plurality of linear steps. In one embodiment, detector 108 may be rotated in a plurality of angular steps. In one embodiment, rotation may be synchronized with translation.

In one embodiment, object 142 may be swept across the transaxial field of view of detector 108 by acquiring 180° of a tomographic study in which the sinogram of object 142 sweeps from one side of the transaxial field of view to the other.

Figure 8:
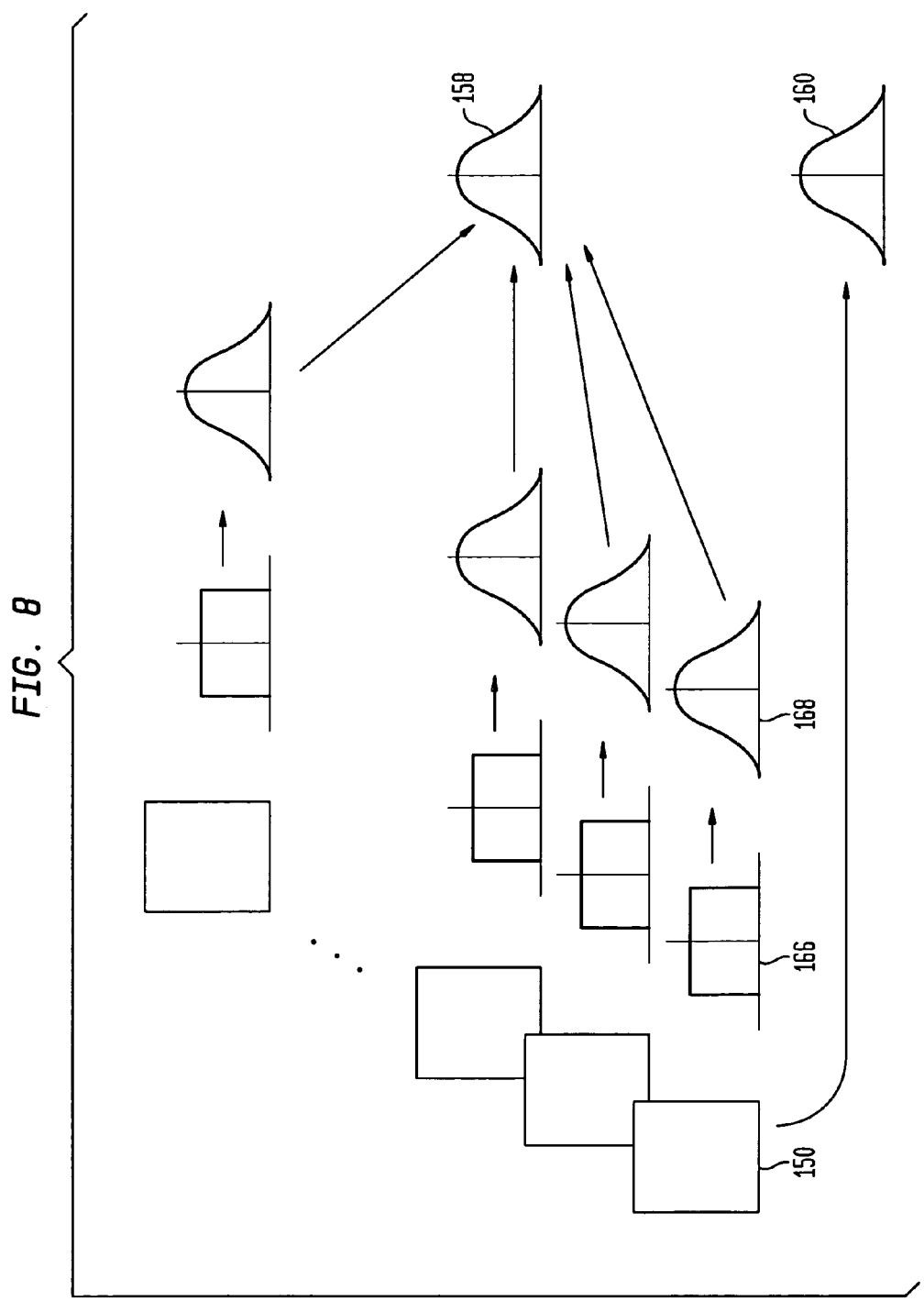
FIG. 8 shows a flood image collection scheme for use with an embodiment of the invention.

As shown in FIG. 8, a plurality of images 150 of object 142 may be acquired with detector 108 during the rotation. Images 150 may be acquired using a step and shoot mode of detector 108. An angular separation 164 between each of images 150 may be spaced such that each projection 160 of each image 150 is displayed substantially evenly across field of view 140.

Images 150 of object 142 may be swept across field of view 140 as detector 108 moves from first position 144 to second position 146. Images 150 will thus be projected onto a surface of detector 108 from various angles as detector 108 moves from first position 144 to second position 146. In one embodiment, object 142 may be swept across a transaxial field of view 140 in full or part by moving bed 102 containing object 142 relative to detector 108.

A flood image 160 may be obtained by summing images 150. A uniformity defect due to positional or angular misalignment of object 142 in flood image 160 could be compensated by fitting an ideal response filter 166 to each of images 150, calculating an ideal response 168 for each of images 150, summing ideal responses 168 to form ideal fit data 158, and dividing a sum of images 150 by ideal fit data 158. Ideal response filter 166 may have a Gaussian response.

In one embodiment, images 150 of object 142 may be summed and processed in order to estimate a uniform extrinsic flooding of imaging system 100. In one embodiment, projection 160 may be fit to a idealized model of a perfectly uniform and straight object 142 with a potential offset and slope in projection 160 and a constant system resolution.

In one embodiment, projection data from the acquisition may be analyzed to generate individual sinograms for each position in the axial field of view 140. In one embodiment, the sinograms may be analyzed to yield the axis of rotation 108 offset of imaging system 100 as a function of the axial location of the sinogram.

The foregoing has described the principles, embodiments, and modes of operation of the present invention. However, the invention should not be construed as being limited to the particular embodiments described above, as they should be regarded as being illustrative and not restrictive. It should be appreciated that variations may be made in those embodiments by those skilled in the art without departing from the scope of the present invention.

While the invention has been described in detail above, the invention is not intended to be limited to the specific embodiments as described. It is evident that those skilled in the art may now make numerous uses and modifications of and departures from the specific embodiments described herein without departing from the inventive concepts.

While various embodiments of the present invention have been described above, they should be understood to have been presented by way of examples only, and not limitation. Thus, the breadth and scope of the present invention should not be limited by the above described embodiments.

Obviously, numerous modifications and variations of the present invention are possible in light of the above teachings. It is therefore to be understood that the invention may be practiced otherwise than as specifically described herein.

What is claimed is:

1. A nuclear medicine imaging system comprising:
   a bed having a direction of translation;
   a detector disposed rotationally about an axis of rotation substantially parallel to said direction of translation; and a single radioactive line source disposed rotationally about said bed substantially opposite said detector at a first predetermined non-zero angle to said axis of rotation and a second predetermined non-zero angle to a plane of rotation of said detector, such that transmission radiation detected by said detector as said detector and radioactive line source are rotated about said axis of rotation has a line source distribution profile.

2. The nuclear medicine imaging system of claim 1, wherein said first predetermined non-zero angle is between about 1° and 89°.

3. The nuclear medicine imaging system of claim 1, wherein said second predetermined non-zero angle is between about 89° and 1°.

4. The nuclear medicine imaging system of claim 1, wherein said first predetermined non-zero angle is selected from the group consisting of: 30°, 45°, and 60°.

5. The nuclear medicine imaging system of claim 1, wherein said second predetermined non-zero angle is selected from the group consisting of: 30°, 45° and 60°.

6. The nuclear medicine imaging system of claim 1, comprising further:
a secondary detector disposed rotationally about said bed; and
a secondary radioactive line source disposed rotationally about said bed opposite said secondary detector at a first secondary predetermined non-zero angle to said axis of rotation and a second secondary predetermined non-zero angle to said plane of rotation;
such that transmission radiation detected by said secondary detector also has a line source distribution profile.

7. The nuclear medicine imaging system of claim 6, wherein said secondary detector is indexed about said axis of rotation relative to said detector an angle selected from the group consisting of: 90°, and 180°.

8. The nuclear medicine imaging system of claim 1, wherein said detector is selected from the group consisting of: a radiation detector, a camera and a gamma camera.

9. A method of nuclear medicine imaging comprising:
translating a bed along a direction of translation;
rotating a detector about an axis of rotation substantially parallel to said direction of translation;
disposing a single radioactive line source substantially opposite said detector at a first predetermined non-zero angle to said axis of rotation and a second predetermined non-zero angle to a plane of rotation of said detector; and
rotating said single radioactive line source about said axis of rotation such that transmission radiation detected by said detector as said line source is rotated about said axis of rotation has a line source distribution profile.

10. The method of nuclear medicine imaging of claim 9, comprising further:
rotating a secondary detector disposed rotationally about said bed;
disposing a secondary radioactive line source substantially opposite said detector at a first secondary predetermined non-zero angle to said axis of rotation and a second secondary predetermined non-zero angle to a plane of rotation of said secondary detector; and
rotating said secondary radioactive line source about said axis of rotation;
such that transmission radiation detected by said secondary detector also has a line source distribution profile.

11. The method of nuclear medicine imaging of claim 9, comprising further: translating said bed in a plurality of linear steps.

12. The method of nuclear medicine imaging of claim 9, comprising further: rotating said detector in a plurality of angular steps.

13. The method of nuclear medicine imaging of claim 9, comprising further: synchronizing said rotation with said translation.

14. A system for nuclear medicine imaging comprising:
means for translating a bed along a direction of translation;
means for rotating a detector about an axis of rotation substantially parallel to said direction of translation;
means for disposing a single radioactive line source substantially opposite said detector at a first predetermined non-zero angle to said axis of rotation and a second predetermined non-zero angle to a plane of rotation of said detector; and
means for rotating said radioactive line source about said axis of rotation such that transmission radiation detected by said detector as said line source is rotated about said axis of rotation has a line source distribution profile.

15. The system for nuclear medicine imaging of claim 14, comprising further:
means for rotating a secondary detector disposed rotationally about said bed;
means for disposing a secondary radioactive line source substantially opposite said secondary detector at a first secondary predetermined non-zero angle to said axis of rotation and a second secondary predetermined non-zero angle to a plane of rotation of said secondary detector; and
means for rotating said secondary radioactive line source about said axis of rotation;
such that transmission radiation detected by said secondary detector also has a line source distribution profile.

16. The system for nuclear medicine imaging of claim 14, comprising further: means for translating said bed in a plurality of linear steps.

17. The system for nuclear medicine imaging of claim 14, comprising further: means for rotating said detector in a plurality of angular steps.

18. The system for nuclear medicine imaging of claim 14, comprising further: means for synchronizing said rotation with said translation.

* * * * *